United States Patent Office 3,531,440
Patented Sept. 29, 1970

3,531,440
ESTER MODIFIED POLYMERS AS FUEL DISPERSANTS
Enver Mehmedbasich, El Cerrito, and Eddie G. Lindstrom, Martinez, Calif., assignors to Chevron Research Company, a corporation of Delaware
No Drawing. Original application Apr. 28, 1965, Ser. No. 451,663. Divided and this application Feb. 10, 1969, Ser. No. 816,449
Int. Cl. C08f 27/00
U.S. Cl. 260—78.4
6 Claims

ABSTRACT OF THE DISCLOSURE

Succinic substituted polymers of alpha-olefins are employed as dispersants in fuels. The polymers are of at least 100,000 molecular weight, the carbon atoms of the olefins have an average number in the range of 6 to 18 and the esters have hydrocarbon groups of from 1 to 30 carbon atoms.

CROSS-REFERENCES TO RELATED APPLICATIONS

This application is a divisional of application Ser. No. 451,663, filed Apr. 28, 1965.

This invention concerns novel fuel oil additives and fuel compositions derived therefrom. More particularly, this invention concerns novel succinate substituted polyolefins which find use as fuel additives and the fuel compositions containing them.

Fuels are susceptible to chemical reaction on aging. The effect of oxidation is to produce soluble and insoluble materials of higher molecular weight and boiling point than the original fuel. The deterioration due to oxidation and the like of distillate fuels, particularly in diesel fuels, manifests itself, for example, through the appearance of color and gums. The tacky, oxidized fuel deposits adhere readily to injector parts and can cause injector sticking, nozzle hole plugging and leakage past critical surfaces. The color is objectionable to customers and in pipeline transmission.

Also, diesel engines are equipped with fuel filters to remove particulate matter from the fuel. Any gums which are present in the fuel tend to coat on to the filter requiring frequent changes of the filter in order to permit adequate fuel flow, as well as effective filtering action.

Pursuant to this invention, succinate substituted polymers of α-olefins, having an average number of carbon atoms in the range of 6 to 18 carbon atoms, and of at least 100,000 molecular weight are provided, wherein the hydrocarbyloxy group of the succinate ester is of from 1 to 30 carbon atoms, more usually of from 1 to 20 carbon atoms. (Hydrocarbyloxy is a hydrocarbyl group bonded to an ethereal oxygen (—O—); hydrocarbyl is a monovalent organic radical composed solely of carbon and hydrogen which may be aliphatic, alicyclic, aromatic, or combinations thereof, e.g., alkaryl or aralkyl and may be aliphatically saturated or unsaturated, e.g., olefinic unsaturation.) These materials find use as dispersants and detergents in various fuels.

The polymeric dispersant will have at least about 100,000 molecular weight and will generally not exceed 1,000,000 molecular weight ($1 \times 10^{5-6}$); preferably, the molecular weight will be in the range of about 150,000 to 500,000. The equivalent weight, that weight determined by dividing the total molecular weight by the total number of succinate groups present per molecule, will be in the range from about 3,000 to 10,000, preferably in the range of from 4,000 to 8,000.

As indicated, the hydrocarbyloxy group (the portion of the ester derived from an alcohol) is of from 1 to 30 carbon atoms. Either the mono- or diester may be present or mixtures thereof. That is, from about 0.9 to 2 hydrocarbyloxy groups will be present per succinic acid present in the molcule.

Alternatively, the polymer may be described by the following formula of a recurring unit:

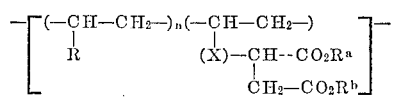

wherein R is hydrogen or an alkyl group of from 1 to 20 carbon atoms, more usually an alkyl group of from 4 to 18 carbon atoms, desirably of from 6 to 18 carbon atoms, at least one of $R^a$ and $R^b$ is a hydrocarbyl group of from 1 to 30 carbon atoms and the other is hydrogen or hydrocarbyl of from 1 to 30 carbon atoms, and X is an aliphatic hydrocarbon divalent radical of from 4 to 18 carbon atoms, more usually of from 6 to 16 carbon atoms. Generally, X will be alkylene or alkenylene.

While olefins from ethylene to docosene (2 to 22 carbon atoms) may be used in the polymer, the average number of carbon atoms should be in the range of 8 to 18 carbon atoms. Preferably, olefins in the range of 8 to 20 carbon atoms will be used.

n will depend on the average number of carbons in R and the desired equivalent weight, being an integer generally varying in the range of 10 to 100, more usually from 15 to 80.

It is preferred that the total number of carbon atoms in $R^a$ and $R^b$ is in the range of 6 to 28, more usually in the range of 8 to 18. Moreover, while both the mono- and diester are operative, the diester is preferred.

Illustrative radicals for $R^a$ and $R^b$ are methyl, ethyl, propyl, butyl, pentyl, hexyl, heptyl, octyl, decyl, dodecyl, tetradecyl, hexadecyl, octadecyl, eicosyl, docosyl, allyl, pentenyl, octenyl, tetradecenyl, hexadecenyl, octadecenyl, octadecadienyl, cyclohexyl, cyclooctyl, phenyl, tolyl, tetrapropenylphenyl, benzyl, phenethyl, etc. Preferred groups are the aliphatic groups, particularly straight-chained aliphatic groups. Moreover, while the alcohols of the esters may be primary, secondary or tertiary, preferred alcoholic groups are the primary or secondary groups. That is, the carbon to which the oxygen is attached has at least one hydrogen bonded to it.

The compositions of this invention can be readily prepared by copolymerizing α-olefins of at least 2 carbon atoms and not more than 22 carbon atoms with non-conjugated diolefins of at least 6 carbon atoms and not more than 20 carbon atoms, generally of from 8 to 18 carbon atoms; adducting maleic anhydride to the aliphatic unsaturation present in the polymer; and reacting the maleic anhydride adducted polymer with an alcohol under conditions which form either the mono- or diester.

The ratio of mono- to diolefin will depend upon the desired equivalent weight, usually about 10–25 to 1 mole ratio of mono-olefin to diolefin will be used.

As indicated, olefins of from 2 to 22 carbon atoms can be used, but preferably the olefins will be of at least 6 carbon atoms and more usually in the range of 8 to 20 carbon atoms. Illustrative of α-olefins or 1-olefins which find use are ethylene, propylene, butylene, 4-methylpentene-1, hexene-1, heptene-1, octene-1, nonene-1, decene-1, undecene-1, dodecene-1, tridecene-1, tetradecene-1, pentadecene-1, hexadecene-1, heptadecene-1, octadecene-1, nonadecene-1, eicosene-1, heneicosene-1, and docosene-1.

The diolefins which find use may have both olefins terminally situated or only one olefin group in the terminal position. Illustrative of various diolefins are 1,7-octadiene, 1,9 - decadiene, 1,11 - dodecadiene, 1,15 - hexadecadiene, 1,11-hexadecadiene, 1,10-dodecadiene, etc.

The olefins are most conveniently polymerized with "Ziegler-type" catalysts. These catalysts generally include a transition metal compound such as the halide, oxide or alkoxide and an organo-metallic compound with a metal of Groups I–III of the Periodic Chart. Most conveniently, titanium tri- or tetrachloride or vanadium trichloride or oxychloride is combined with a trialkyl aluminum, dialkyl aluminum halide, or alkyl aluminum dihalide such as triethyl aluminum, triisobutyl aluminum, diethyl aluminum chloride or ethyl aluminum dichloride. These "Ziegler-type" catalysts are well known in the art and do not require extensive exemplification here. See, for example, "Stereospecific Catalysis" beginning at page 93 in the journal, Chemical Engineering for Apr. 2, 1962, McGraw-Hill Publishing Company, New York.

The copolymerization is conveniently carried out at temperatures from about 30° C. to about 150° C. at atmospheric pressure. The lower temperatures give copolymers of higher molecular weight. A hydrocarbon diluent, such as toluene, xylene, petroleum naphtha or mineral lubricating oil is commonly employed. The reaction time is ordinarily from about 0.5 to 10 hours. When the polymerization is completed, the reaction is stopped by quenching with an alcohol, thus deactivating the catalyst and precipitating the copolymer product from the inert hydrocarbon diluent.

In the present invention, the preferred copolymers are derived from cracked wax olefin mixtures of (A) $\alpha$-olefins of from about 6 to about 22 carbon atoms and (B) diolefins of from about 6 to about 20 carbon atoms. Such cracked wax olefin copolymers are described in copending application Ser. No. 248,212, filed Dec. 31, 1962.

The cracked wax olefin mixtures are suitably prepared by thermocracking of conventional refined paraffin waxes derived from typical waxy crude oils. While about 90 percent by weight of the wax is normal paraffins, the balance of the wax composition is made up of isoparaffins, naphthenes and small proportions of aromatic hydrocarbons. The wax is cracked at temperatures of about 500° to about 600° C. with exposure times of only a few seconds. The resulting distribution of olefins may then be distilled to separate into various fractions. For further description of the process, see U.S. Pat. No. 2,172,228.

The analysis of a typical cracked wax olefin mixture indicates the following distribution of products:

TABLE I

| | Wt. percent |
|---|---|
| Straight-chain $\alpha$-olefins | 89 |
| Straight-chain $\alpha,\omega$-diolefins | 5 |
| Straight-chain $\alpha$-internal olefins | 1 |
| Branched-chain and naphthenic hydrocarbons | 3 |
| Conjugated internal diolefins, etc. | 2 |

In the adduction reaction, the maleic anhydride adds to the unsaturated hydrocarbon radicals which are generally pendant from the polymer backbone to give succinic anhydride groups. The temperatures of the adduction are ordinarily between about 100° and 300° C., more usually between 150° and 250° C. The copolymer and maleic anhydride are heated together until the adduction is essentially complete as indicated by no further consumption of maleic anhydride. Usually from about 4 to 24 hours is sufficient.

If desired, the adduction may be carried out by other techniques, for example, by reaction of a chlorinated polymer containing about 1 weight percent chlorine with maleic anhydride. Residual chlorine or other nonhydrocarbon substituent does not alter the essentially hydrocarbon character of the polymers, needed for oil solubility.

The resulting maleic anhydride adducted copolymer may then be reacted with the desired alcohol or alcohols at temperatures in the range of about 100° to 150° C. Usually at least one equivalent of alcohol will be used per maleic anhydride present. If the diester is desired, an excess of from 2 to 5 equivalents of alcohol per maleic anhydride will be used. Conveniently, an acid catalyst may be used. With the diester, the reaction can be followed by removal of the water of reaction as it is formed. When an amount of water has been formed equivalent to the number of maleic anhydride groups present, the reaction may be stopped. Otherwise, other convenient methods may be used, e.g., infrared spectroscopy. Generally, from 2 to 24 hours will suffice for completion of the reaction.

To facilitate the removal of water of reaction, an inert diluent is generally used. Useful diluents are aromatic hydrocarbons which will boil in the range of 100° to 150° C.

The following examples are offered by way of illustration and not by way of limitation.

EXAMPLE A

Exemplary "Ziegler-type" polymerization

In this example, a "Ziegler-type" high molecular weight unsaturated polymer is synthesized from a typical mixture of cracked wax olefins of about 10 to 20 carbon atoms containing about 90% by weight straight-chain $\alpha$-olefins and about 6% by weight diolefins.

A co-catalyst mixture is prepared by introducing 75 ml. of dry heptane into a 2-liter flask fitted with condenser and stirrer. Into the flask under nitrogen is then added 7.5 g. of titanium trichloride AA (aluminum activated) followed by the addition of 9.35 g. of triisobutyl aluminum in 75 ml. of dry heptane.

Into the catalyst mixture is added dry xylene under nitrogen and the mixture heated to reflux. To the refluxing catalyst suspension is added 200 g. of cracked wax olefins containing from 10 to 20 carbon atoms. External heat is removed until the temperature increase due to the polymerization of the reaction subsides, followed by heating again to reflux. After 45 minutes of reflux, external heat is removed and upon the temperature dropping to 100° C., isopropyl alcohol is added until no further violent reaction occurs. The subsequent addition of gross amounts of methanol precipitates the polymer. The supernatant liquid is discarded, and the polymer is first washed with methanol and then with acetone. After three subsequent precipitations from benzene solution with acetone, the polymer is dissolved in benzene. Yield=89%.

EXAMPLE B

Adduction of maleic anhydride to cracked wax olefin polymer

Into a flask is introduced 60 g. of cracked wax olefin copolymer prepared in Example A, 120 g. of cetane, 25 g. of maleic anhydride, and 2 g. of bis-(dibutylhydroxyphenyl)methane and the mixture heated for 24 hours at about 210° C. in a nitrogen atmosphere. At the end of this time, the adduct is precipitated with dry acetone and redissolved in benzene, repeating this operation three times. The last benzene solution is filtered over activated clay. The equivalent weight based on succinic anhydride is found to be approximately 6,000. The molecular weight of the adduct is about 300,000.

EXAMPLE C

In this example, the equipment and general procedure are the same as in Example A. Into the reaction flask is charged 200 g. of a cracked wax olefin mixture and 5 g. of phenyl-$\beta$-naphthylamine. The cracked wax olefin mixture consists of 30% $C_{9-11}$, 40% $C_{11-15}$ and 30% $C_{15-20}$ olefins.

TABLE II

| | Mol percent | | |
|---|---|---|---|
| | $C_{9-11}$ | $C_{11-15}$ | $C_{15-21}$ |
| $C_8$ | 1 | | |
| $C_9$ | 22 | | |
| $C_{10}$ | 55 | 1 | |
| $C_{11}$ | 21 | 13 | |
| $C_{12}$ | 1 | 24 | |
| $C_{13}$ | | 24 | |
| $C_{14}$ | | 24 | 1 |
| $C_{15}$ | | 13 | 12 |
| $C_{16}$ | | 1 | 19 |
| $C_{17}$ | | | 18 |
| $C_{18}$ | | | 18 |
| $C_{19}$ | | | 17 |
| $C_{20}$ | | | 14 |
| $C_{21}$ | | | 1 |

The charge is heated to about 100° C. and the equipment and charge are purged with nitrogen to remove oxygen.

The co-catalyst mixture consists of 4.5 g. of the titanium trichloride AA in 50 ml. of xylene and 2.9 ml. of ethyl aluminum dichloride in 50 ml. of xylene, which are added to the reaction flask. The rate of addition of co-catalysts was controlled to maintain the reaction temperature at about 100° to 110° C. External cooling may be required in order to maintain this temperature.

After about 3 hours, the evolution of heat ceases and the reaction is stopped. To the mixture, 40 ml. of ethanolamine is added and the mixture stirred for about 30 minutes. The polymeric product is then precipitated with methanol, dissolved in benzene and azeotroped free of methanol. The yield is 740 g.

EXAMPLE 1

Into a reaction flask was introduced 78 g. (0.02 equiv.) of a maleic anhydride adducted polymer (30 weight percent $C_{9-11}$, 40 weight percent $C_{11-15}$, 30 weight percent $C_{15-20}$ olefins, the compositions of the fraction are as described previously, molecular weight=approx. 200,000, equivalent weight per succinyl anhydride=approx. 4,500), 3.8 g. (0.52 mole) of dodecyl alcohol and 312 g. of xylene. The mixture was stirred and held at a temperature of 140° C. for 4 hours. At the end of this time, the reaction product was precipitated with acetone and was washed with methanol. The yield was 74 g. (92%). The infrared spectrum of the mono-dodecyl ester of the succinate substituted product was characterized by infrared bands at 1,740 cm.$^{-1}$, 1,700 cm.$^{-1}$ and 1,160 cm.$^{-1}$.

EXAMPLE 2

Into a reaction flask was introduced 78 g. (0.02 equiv.) of the polymer described in Example 1, 9.3 g. (0.04 mole) of allyl alcohol, 312 g. of xylene and 0.8 g. (1%) of para-toluene sulfonic acid monohydrate. The mixture was stirred at a temperature of 80° C. for 16 hours at which time approximately 1 equivalent of water had collected in the water trap. The reaction product was precipitated with acetone and washed with methanol. The yield was 74 g. (90%). The infrared spectrum of the di-allyl ester was characterized by bands at 1,740 cm.$^{-1}$ and 1,160 cm.$^{-1}$.

The additive of this invention may be used with various hydrocarbon distillate fuels, particularly the higher boiling range fuels. These fuels include: the aircraft gas turbine engine fuels, commonly referred to as the "jet fuels"; kerosenes; gas oils, and particularly the thermal and catalytically cracked gas oils; compression-ignition, internal combustion fuels, such as diesel fuels; and the conventional burner or furnace oils.

The amount of dispersant will vary depending on the fuel and particular dispersant. Usually, the amount of dispersant providing good sludge and gum control will be in the range of 0.0001 to 1.0 weight percent, more usually 0.0005 to 0.5 weight percent of the fuel composition. However, the dispersants can be conveniently prepared as concentrates, being diluted prior to use. As concentrates, the amount of dispersant will usually vary from 10 to 70 weight percent of the total composition.

Other additives may also be incorporated with the fuel. Such additives include antioxidants, metal deactivators, cetane improvers, pour point depressors and anti-smoke additives.

A number of esters were prepared following the described procedures using a variety of alcohols. These esters were tested under a variety of generally accepted tests which determine the acceptability of the composition as a fuel dispersant.

An accelerated aging test to determine stability comprises heating a sample fuel for 90 minutes at 300° F., cooling at ambient temperatures for 90 minutes and then filtering through a Whatman No. 1 filter paper. The appearance of the deposits on the filter is rated by a reflectometer on a rating scale of 100 percent reflectance for a new white filter and a 0 percent reflectance for a completely black filter.

A second stability test was carried out by heating the fuel for 20 hours at 200° F. The fuel was then cooled at ambient temperature for 24 hours and filtered through a tared 5 micron pore size Millipore membrane filter. The filter is then weighed and the results are shown as percent deposits reduced. The value is calculated as follows:

$$100 - \left(\frac{\text{p.p.m. filter residue of compounded fuel}}{\text{p.p.m. filter residue of base oil}}\right) \times 100$$

A third test is referred to as the Hot Nozzle Injector Test. The test uses a modified CRF diesel engine where the fuel injector system has the nozzle cooling restricted in order to increase the severity of the test. The injector deposits obtained in this test are rated with the aid of a reflectometer. The results are reported as percent deposits reduced.

The following Table III describes the various polymers and indicates the results obtained from the above test. The polymers were all prepared using 30, 40, 30 mole percent respectively of $C_{9-11}$:$C_{11-15}$:$C_{15-20}$ fractions (the compositions of the fractions have been described previously) and are all with one exception of about 200,000 molecular weight and of about 4,500 equivalent weight per succinate. The fuel used was an aged fuel comprising 70% FCC light cycle oil plus 30% vacuum top cut straight run.

TABLE III

| Ester [1] | Adduct equivalent weight | 90 minutes 300° F. percent reflectance at 100 p.p.m. | 20 hours 200° F. percent deposit reduced at 100 p.p.m. | Hot nozzle injector test percent deposit reduced at 200 p.p.m. |
|---|---|---|---|---|
| None | | (51) | | |
| Monomethyl [2] | 8000 | 81 | 75 | 6 |
| Monobutyl | 4500 | 72 | 90 | 9 |
| Monododecyl | 4500 | 72 | 90 | |
| Monooctadecyl | 4500 | 72 | 90 | |
| Di-n-butyl [3] | 5500 | 59 | 70 | |
| Di-n-butyl | 4500 | 57 | 90 | |
| Di-n-heptyl | 4500 | 67 | 90 | |
| Di-n-dodecyl | 6000 | 53 | 29 | 12 |
| Di-n-dodecyl | 4500 | 50 | 67 | 12 |
| Diallyl | 4500 | 69 | 89 | |
| Dibenzyl | 4500 | 74 | 90 | |
| Diphenyl | 4500 | 69 | 92 | |

[1] The polymers are (except where otherwise indicated) of about 2×10$^5$ molecular weight and composed of 30 wt. percent $C^{9-11}$, 40 wt. percent $C^{11-15}$ and 30 wt. percent $C^{15-20}$ fractions. (The fractions compositions are as previously described.)
[2] 100,000 molecular weight.
[3] 50 wt. percent $C^{11-15}$ and 50 wt. percent $C^{15-20}$ (the fractions' compositions are as previously described) and of about 200,000 molecular weight.

It is evident from the above table that excellent results are obtained in a variety of tests which demonstrate the efficacy of the various esters of this invention as dispersants in fuels.

While not essential to the satisfactory operation of the fuel additive, it is preferable that the dispersants do not enhance the emulsibility of water with the fuel. It is found that the aliphatic diesters, for the most part, minimize emulsibility. Emulsibility is determined by vigorously shaking a sample of the fuel with water for one minute and allowing it to settle. The amount of time in which a clean break occurs indicates the emulsibility.

As will be evident to those skilled in the art, various modifications on this invention can be made or followed, in the light of the foregoing disclosure and discussion, without departing from the spirit or scope of the disclosure or from the scope of the following claims.

We claim:

1. As a composition of matter, a polymer having a molecular weight in the range of 100,000 to 1,000,000 and having as its recurring unit a group of the formula

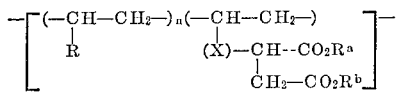

wherein $n$ is an integer in the range of 10 to 100, R is selected from the group consisting of hydrogen and alkyl of from 1 to 20 carbon atoms, wherein the average number of carbon atoms is in the range of 4 to 16, one of $R^a$ and $R^b$ is a hydrocarbyl group of from 1 to 30 carbon atoms and the other is selected from the group consisting of hydrogen and hydrocarbyl of from 1 to 30 carbon atoms, and X is an aliphatic hydrocarbon divalent radical of from 4 to 18 carbon atoms.

2. A composition according to claim 1 wherein $n$ is of from 15 to 80 carbon atoms, and at least one of $R^a$ and $R^b$ is in the range of 6 to 28 carbon atoms.

3. A composition according to claim 1 wherein $n$ is an integer in the range of 15 to 80 and $R^a$ and $R^b$ are aliphatic hydrocarbon radicals of from 8 to 18 carbon atoms.

4. A composition according to claim 1 wherein $n$ is in the range of 15 to 80, R is of from 8 to 20 carbon atoms and $R^a$ and $R^b$ are aliphatic hydrocarbon radicals of 8 to 18 carbon atoms.

5. A composition according to claim 1 wherein $n$ is of from 15 to 80, R is in the range of 8 to 20 carbon atoms and $R^a$ and $R^b$ are dodecyl.

6. A composition according to claim 1 wherein $n$ is of from 15 to 80, R is in the range of 8 to 20 carbon atoms and wherein one of $R^a$ and $R^b$ is butyl and the other is hydrogen.

References Cited

UNITED STATES PATENTS

| | | | |
|---|---|---|---|
| 3,010,810 | 11/1961 | Stayner et al. | 44—62 |
| 3,197,409 | 7/1965 | De Vries | 252—56 |

JOSEPH L. SCHOFER, Primary Examiner

J. KIGHT III, Assistant Examiner

U.S. Cl. X.R.

44—62, 70; 252—56; 260—78.5